United States Patent Office 3,579,517
Patented May 18, 1971

3,579,517
SECONDARYAMINO PYRIDAZINES
William J. Houlihan and Robert E. Manning, Mountain Lakes, N.J., assignors to Sandoz-Wander, Inc., Hanover, N.J.
No Drawing. Continuation-in-part of application Ser. No. 849,151, Aug. 11, 1969, which is a continuation-in-part of application Ser. No. 671,962, Oct. 2, 1967. This application Sept. 22, 1969, Ser. No. 860,059
Int. Cl. C07d *51/04*
U.S. Cl. 260—250         16 Claims

ABSTRACT OF THE DISCLOSURE

Secondaryamino pyridazines and hydrazine substituted secondaryamino pyridazines, e.g., 3,6-dichloro-4-diallylaminopyridazine and 3 - chloro - 4 - dimethylamino-6-hydrazinopyridazine, are prepared from 3,4,6-trihalopyridazines and are useful as central nervous system stimulants and as anti-hypertensives.

---

This application is a continuation-in-part of a patent application Ser. No. 849,151 filed Aug. 11, 1969, now abandoned, which is a continuation-in-part of application Ser. No. 671,962, filed Oct. 2, 1967, now abandoned.

This invention pertains to novel heterocyclic compounds and more particularly to novel substituted amino pyridazines. Still more particularly, this invention concerns 3 - halo-4-secondaryamino-6-hydrazino pyridazines, intermediates therefore and their methods of preparation.

The compounds of this invention may be represented by the formula

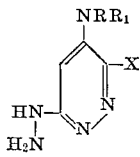

(I)

wherein

X represents halo of atomic weight between about 35 to 80, and
each R and $R_1$ independently represent lower alkyl, i.e., alkyl having 1 to 4 carbon atoms, such as methyl, ethyl, or propyl; phenyl; propargyl; phenyl lower alkyl such as benzyl;

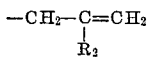

wherein $R_2$ represents hydrogen or methyl; or
$NRR_1$ together represent 3--azabicyclo[3.2.2]-nonyl
or a pharmaceutically acceptable acid addition salt thereof.

The pyridazines of Formula I may be prepared according to the following flow diagram:

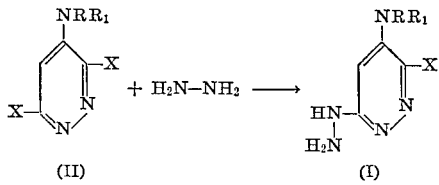

where X, R and $R_1$ are as defined above, and each X is the same.

The compounds of Formula I are prepared by treating secondaryamino pyridazines (II) with hydrazine. The temperature utilized is not critical but the reaction is generally carried out at a temperature of from about room temperature to about 115° C. Desirably, a temperature of about from 60° to 115° C. and preferably about 80° to 115° C. may be used. A solvent is usually employed but is not critical in obtaining the desired product (I). Excess hydrazine may be used as the solvent, and inert solvents such as lower alkanols, especially methanol, ethanol, isopropanol and the like, may also be used. The 6-hydrazino - 4 - secondaryamino - 3 - halopyridazines of Formula I are recovered by conventional techniques, e.g., fractional crystallization or chromatography.

The process for preparing the 4-substituted pyridazines (II) is shown in the following reaction scheme:

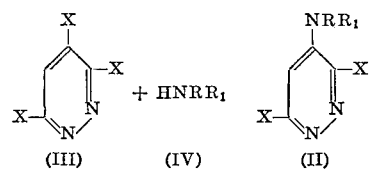

where X, R and $R_1$ are as defined above and each X is the same. The compounds of Formula II are new and represent an additional aspect of this invention.

The compounds of Formula II are prepared by treating the 3,4,6-trihalopyridazine (III) with a secondaryamine (IV). This process can be carried out in an inert solvent, or excess amine (IV) may be used. Inert solvents which can be used in preparing the pyridazines of Formula II include alcohols, especially the lower alkanols, e.g., ethanol, isopropanol, and the like. The particular solvent used is not critical. Generally, a temperature of from about room temperature to reflux temperature may be used and desirably, temperatures of 25° to 175° C. are used. A temperature in the range of 50° to 100° C. is preferred. The 4-substituted amino pyridazines (II) may be isolated using conventional techniques, such as extraction, crystallization or chromatography.

The substituted amine reactants utilized in obtaining compounds (II) are secondary amines having the general formula

where R and $R_1$ are as described above. Some of the amines which may be used are:

dibenzylamine
dipropargylamine
N-β-methallylbenzylamine
N-propargylbenzylamine
diallylamine
dimethylamine
diphenylamine
3-azabicyclo[3.2.2]nonane
diethylamine
N-methyl aniline and the like.

The trihalopyridazines of Formula III and many of the secondaryamines (IV) employed in the above-described process are known and are prepared by methods described in the literature. Those secondary amines not specifically described in the literature may be prepared from available materials by analogous methods.

The pyridazines represented by Formulae I and II above are useful because they possess pharmacological properties in animals. In particular, these compounds are useful as anti-hypertensives as indicated by their activity in renal hypertensive rats given 30 mg./kg. of active compound using the technique of A. Grollman (Proc. Soc. Exptl. Biol. and Med. 57: 102, 1944) and indirectly measuring the blood pressure from the caudal artery in the tail using a pneumatic pulse transducer.

These compounds are central nervous system stimulants and can be used, in particular, as anti-depressants and psychic-energizers, as indicated by their activity in mice tested according to the 30-word adjective check sheet system basically as described by S. Irwin (Gordon Research Conference, Medicinal Chemistry, 1959) and Chen (Symposium on Sedative and Hypnotic Drugs, Williams and Wilkins, 1954).

When so utilized, the compounds may be combined with one or more pharmaceutically acceptable carriers or adjuvants. They may be administered orally or parenterally and, depending upon the compound employed and the mode of administration, the exact dosage utilized may vary. Furthermore, the compounds (I) and (II) may be similarly administered in the form of their non-toxic pharmaceutically acceptable acid addition salts. Such salts possess the same order of activity as the free base, are readily prepared by reacting the base with an appropriate acid and accordingly, are included within the scope of the invention. Representative of said salts are the mineral acid salts, such as the hydrochloride, hydrobromide, sulfate, phosphate and the like and the organic acid salts, such as the succinate, benzoate, acetate, p-toluenesulfonate, benzenesulfonate and the like.

In general, satisfactory results are obtained when these compounds are administered as antihypertensive agents at a daily dosage of about 0.4 milligrams to about 50 milligrams per kilogram of animal body weight. This daily dosage is preferably administered 2 to 4 times a day, or in sustained release form. For most large animals, the total daily dosage is from about 30 milligrams to about 450 milligrams. Dosage forms suitable for internal use comprise from about 7.5 milligrams to about 225 milligrams of the active compounds in intimate admixture with a solid or liquid pharmaceutically acceptable carrier or diluent. When used as a psychic stimulant or antidepressant, satisfactory results are obtained at a daily dosage of about 0.5 to 100 milligrams per kilogram of animal body weight. This daily dosage is preferably administered 2 to 4 times a day. For most large animals, the total daily dosage is from about 30 to 600 milligrams. Daily dosage forms suitable for internal use comprise from about 7.5 to about 300 milligrams of active compound in intimate admixture with a liquid or solid pharmaceutically acceptable carrier.

A representative formulation suitable for oral administration is a tablet prepared by standard tabletting techniques which contains the following:

| Ingredient: | Parts by weight |
| --- | --- |
| 3 - chloro - 4 - dimethylamino - 6 - hydrazinopyridazine | 10 |
| Tragacanth | 2 |
| Lactose | 79.5 |
| Corn starch | 5 |
| Talcum | 3 |
| Magnesium stearate | 0.5 |

EXAMPLE 1

3,6-dichloro-4-dibenzylaminopyridazine

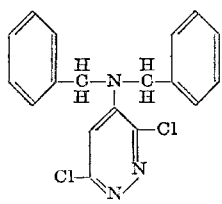

To a flask equipped with a stirrer and condenser is added 10.5 g. (0.058 mole) of 3,4,6-trichloropyridazine, 34.4 g. (0.175 mole) of dibenzylamine and 200 ml. of absolute ethanol. The reaction mixture is refluxed with stirring for 24 hours. The solvent is removed in vacuo and 100 ml. of 2 N sodium hydroxide is added. The product is extracted with 200 ml. of benzene and the benzene layer is washed with 100 ml. of water and then 100 ml. of saturated sodium chloride solution. The benzene layer is dried with sodium sulfate, filtered and the solvent removed in vacuo. The residue is crystallized from pentane to give 3,6 - dichloro - 4 - dibenzylaminopyridazine; M.P., 127° to 131° C.

EXAMPLE 2

3,6-dichloro-4-dipropargylaminopyridazine

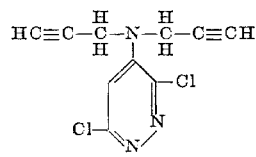

Absolute ethanol (200 ml.), 15.3 g. of 3,4,6-trichloropyridazine and 23.3 g. of dipropargylamine are added to a flask equipped with a stirrer and condenser. The mixture is refluxed with stirring for 26 hours and the solvent is removed in vacuo. 2 N sodium hydroxide (125 ml.) is then added and the resulting mixture is admixed with 250 ml. of benzene. The benzene layer is washed with 125 ml. of water and then with 125 ml. of saturated sodium chloride solution. The residue is chromatographed through silica gel and the fraction eluted with pentane-benzene (1:1) is crystallized from 50 ml. of ether-pentane (1:1) to provide 3,6 - dichloro - 4 - dipropargylaminopyridazine; M.P., 99° to 100° C.

EXAMPLE 3

3,6-dichloro-4-(N-β-methallylbenzylamino)pyridazine

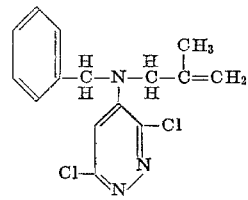

There is admixed 16.7 g. (0.091 mole) of 3,4,6-trichloropyridazine, 44.0 g. (0.273 mole) of N-β-methallylbenzylamine and 250 ml. of absolute ethanol and the mixture is heated to reflux in a flask having a stirrer and condenser. Reflux is continued for 24 hours and the solvent is evaporated in vacuo. 2 N sodium hydroxide (150 ml.) is added. The mixture is extracted with 300 ml. of benzene and the benzene layer is separated and washed with 150 ml. of water and 150 ml. of saturated sodium chloride solution. The residue is chromatographed through a column of silica gel and the fraction eluted with pentane-chloroform (1:1) is crystallized from 150 ml. of ether-pentane (1:1) giving 3,6 - dichloro - 4 - (N - β - methallylbenzylamino)pyridazine; M.P., 79° to 80° C.

EXAMPLE 4

3,6-dichloro-4-(N-propargyl-N-benzylamino)pyridazine

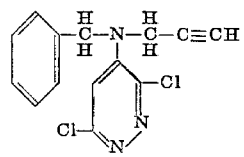

Absolute ethanol (200 ml.), 12.6 g. (0.07 mole) of 3,4,6-trichloropyridazine, and 29.8 g. (0.21 mole) of N-propargylbenzylamine are added to a flask equipped with a stirrer and condenser. The mixture is refluxed with stirring for 26 hours and the solvent is removed in vacuo. Sodium hydroxide (2 N, 125 ml.) is added to the mixture and benzene is then added (225 ml.) to extract the product. The benzene layer is separated and washed with 125 ml. of water, 125 ml. of saturated sodium chloride solution, and the residue is chromatographed over a silica gel column. The fraction eluted with benzene provides 3,6-dichloro-4-(N-propargyl-N-benzylamino)pyridazine, as a viscous oil.

EXAMPLE 5

3,6-dichloro-4-diallylaminopyridazine

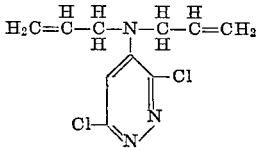

To a flask equipped with a stirrer and condenser is added 800 ml. of absolute ethanol, 60 g. (0.33 mole) of 3,4,6-trichloropyridazine, and 94 g. (0.97 mole) of diallylamine. The mixture is stirred and refluxed for 25 hours and poured into 400 ml. of water. Sodium hydroxide (50%) is added until the pH is 10.0. The mixture is extracted three times with 300 ml. of ethyl ether. The ether layer is then separated, dried with sodium sulfate, filtered and concentrated to about one-third its original volume. The product, 3,6-dichloro-4-diallylaminopyridazine, crystallized and has a melting point of 52° to 54° C.

EXAMPLE 6

3,6-dichloro-4-dipropylaminopyridazine

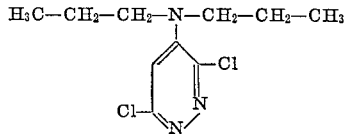

Absolute ethanol (500 ml.), 60.7 g. (0.60 mole) of dipropylamine, and 36.7 g. (0.20 mole) of 3,4,6-trichloropyridazine are added to a flask equipped with a stirrer and condenser. The mixture is refluxed with stirring for 24 hours and the solvent is removed in vacuo. The residue is dissolved in benzene and washed with 2 N sodium hydroxide (150 ml.), 150 ml. of water, and 150 ml. of saturated sodium chloride solution. The remaining solution is dried with magnesium sulfate, filtered, and concentrated in vacuo. The residue is distilled to give 3,6-dichloro-4-dipropylaminopyridazine; B.P. 162° at 0.5 millimeters Hg.

EXAMPLE 7

3,6-dichloro-4-(3-azabicyclo[3.2.2]nonyl)pyridazine

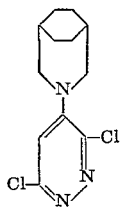

About 750 ml. of absolute ethanol, 63 g. (0.60 mole) of 3-azabicyclo[3.2.2]nonane, and 36.5 g. (0.70 mole) of 3,4,6-trichloropyridazine are stirred and refluxed in a flask for 24 hours. The solvent is removed in vacuo and the residue is dissolved in 250 ml. of benzene. The solution is then washed with 100 ml. of cold 2 N sodium hydrochloride, 100 ml. of water, and 100 ml. of saturated sodium chloride solution consecutively. The solution is then dried with magnesium sulfate, filtered and the solvent is removed by evaporation. The residue is crystallized from tetrahydrofuran to give 3,6-dichloro-4-(3-azabicyclo [3.2.2]nonyl)pyridazine; M.P. 108° to 110° C.

EXAMPLE 8

3,6-dichloro-4-(N-methylanilino)pyridazine

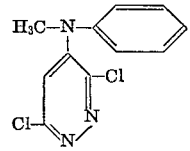

There is admixed in a flask equipped with a stirrer and condenser 5.8 g. (0.032 mole) of 3,4,6-trichloropyridazine, 10.1 g. (0.095 mole) of N-methylaniline, and 100 ml. of absolute ethanol. The mixture is stirred under reflux for 24 hours and the solvent is evaporated in vacuo. The residue is dissolved in 150 ml. of benzene and the resulting solution is washed with 50 ml. of water and 50 ml. of saturated sodium chloride solution. The benzene layer is removed and dried with magnesium sulfate and filtered. The solution is removed and the residue is chromatographed on silica gel using benzene as the eluant to provide a 3,6-dichloro-4-(N-methylanilino)pyridazine; M.P., 116° to 117° C.

EXAMPLE 9

3-chloro-4-dibenzylamino-6-hydrazinopyridazine

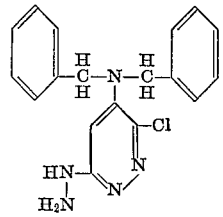

To a flask equipped with a stirrer there is charged 5.0 g. of 3,6-dichloro-4-dibenzylaminopyridazine and 25 ml. of 97% hydrazine. The mixture is stirred with reflux for 4 hours and then poured into 100 ml. of water. The water is decanted off and the residue chromatographed through silica gel. The fraction eluted with chloroform is crystallized from tetrahydrofuran/ether (1:1) to give 3-chloro-4-dibenzylamino-6-hydrazinopyridazine; M.P. 141° to 143° C.

EXAMPLE 10

3-chloro-4-diallylamino-6-hydrazinopyridazine

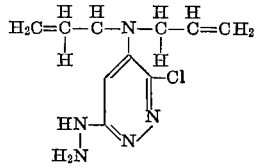

Hydrazine (97%, 50 ml.) and 10 g. of 3,6-dichloro-4-diallylaminopyridazine are added to a flask equipped with a stirrer and condenser. The reaction mixture is heated at reflux temperature for 3 hours, poured into 100 ml. of water and the resulting crystallite is filtered off and recrystallized from 75 ml. of ethyl ether to provide 3-chloro-4-diallylamino-6-hydrazinopyridazine; M.P., 95° to 97° C.

EXAMPLE 11

3-chloro-4-(3-azabicyclo[3.2.2]nonyl)-6-hydrazinopyridazine

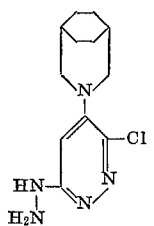

About 40 ml. of hydrazine (90%) and 8.0 g. of 3,6-dichloro - 4 - (3 - azabicyclo[3.2.2]nonyl)pyridazine are stirred an drefluxed for 5 hours and allowed to stand overnight at room temperature. The mixture is then poured into 100 ml. of water and the solids filtered off. Crystallization from tetrahydrofuran/methanol (1:1) provides 3 - chloro - 4 - (3 - azabicyclo[3.2.2]nonyl - 6 - hydrazinopyridazine; M.P., 204° to 210° C.

EXAMPLE 12

3,6-dichloro-4-dimethylaminopyridazine

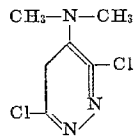

To an ice cooled flask equipped with a stirrer and condenser is added 70.0 g. of 3,4,6-trichloropyridazine, 190 ml. of 40% dimethylamine in water and 300 ml. of ethanol. The reaction mixture is stirred for one hour at room temperature. The solvent is partially removed in vacuo and the crystalline product collected to give 3,6-dichloro-4-dimethylaminopyridazine; M.P., 66° to 68° C.

EXAMPLE 13

3-chloro-4-dimethylamino-6-hydrazinopyridazine

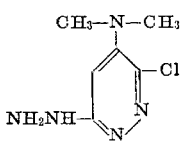

To 50 g. of 3,6-dichloro-4-dimethylamino pyridazine is added 540 ml. of anhydrous 97% hydrazine. The mixture is warmed to 80° C. to dissolve the starting material and then stirred for 4 days at room temperature. The precipitate formed is separated by filtration. The precipitate is dissolved in water and extracted with benzene. The benzene is removed from the extractant by evaporation. The residue is 3-chloro-4-dimethylamino-6-hydrazino pyridazine; M.P., 149° to 150° C.

What is claimed is:

1. A compound of the formula

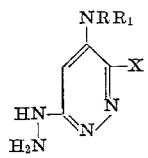

where

X represents halo of atomic weight between about 35 to 80, and each R and $R_1$ independently represent lower alkyl, phenyl, propargyl, phenylloweralkyl,

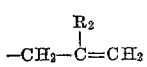

where $R_2$ represents hydrogen or methyl or $NRR_1$ together represents 3-azabicyclo[3.2.2]nonyl, or a pharmaceutically acceptable acid addition salt thereof.

2. The pyridazine compound of claim 1 which is 3-chloro-4-dibenzylamino-6-hydrazinopyridazine.
3. The pyridazine compound of claim 1 which is 3-chloro-4-diallylamino-6-hydrazinopyridazine.
4. The pyridazine compound of claim 1 which is 3-chloro - 4 - (3 - azabicyclo[3.2.2]nonyl) - 6-hydrazinopyridazine.
5. The pyridazine compound of claim 1 which is 3-chloro-4-dimethylamino-6-hydrazinopyridazine.

6. A compound of the formula

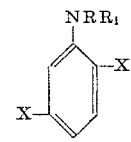

where

X represents halo atomic weight between about 35 to 80, and each X is the same, and each R and $R_1$ independently represents lower alkyl, phenyl, propargyl, phenylloweralkyl,

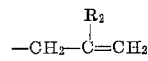

where $R_2$ represents hydrogen or methyl, or $NRR_1$ together represents 3-azabicyclo[3.2.2]nonyl.

7. The pyridazine compound of claim 6 which is 3,6-dichloro-4-dibenzylaminopyridazine.
8. The pyridazine compound of claim 6 which is 3,6-dichloro-4-diallylaminopyridazine.
9. The pyridazine compound of claim 6 which is 3,6-dichloro-4-(3-azabicyclo[3.2.2]nonyl)pyridazine.
10. The pyridazine compound of claim 6, which is 3,6-dichloro-4-dipropargylaminopyridazine.
11. The pyridazine compound of claim 6, which is 3,6-dichloro-4-(N-β-methallylbenzylamino)pyridazine.
12. The pyridazine compound of claim 6 which is 3,6-dichloro-4-(N-propargylbenzylamino)pyridazine.
13. The pyridazine compound of claim 6 which is 3,6-dichloro-4-dipropylamino pyridazine.
14. The pyridazine compound of claim 6 which is 3,6-dichloro-4-(N-methylanilino)pyridazine.
15. The pyridazine of claim 6 which is 3,6-dichloro-4-dimethyl pyridazine.
16. A process for preparing the compound of claim 1 which comprises reacting at a temperature between 25° to 175° C. a compound of the formula:

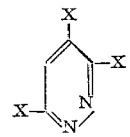

with a compound of the formula:

H—$NRR_1$ to obtain an intermediate of the formula:

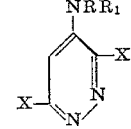

and thereafter reacting at a temperature between room temperature and 175° C. said intermediate with hydrazine where X, R and $R_1$ are as defined in claim 1, and each X is the same.

References Cited

UNITED STATES PATENTS 2,785,161  3/1957  Steck _____ 260—250A
2,960,504  11/1960 Druey et al. _____ 260—250A

OTHER REFERENCES

Chemical Abstracts, vol. 60, pp. 15871–15872 (1964).
Chemical Abstracts, vol. 63, p. 601 (1965).
Chemical Abstracts, vol. 64, pp. 17594–17595 (1966).
Chemical Abstracts, vol. 65, pp. 13673–13674 (1966).

NICHOLAS S. RIZZO, Primary Examiner

U.S. Cl. X.R.

424—250